United States Patent [19]

Stetson

[11] Patent Number: 4,618,530
[45] Date of Patent: Oct. 21, 1986

[54] PROCESS FOR THE PREPARATION OF A COMPOSITE MAT

[75] Inventor: John R. Stetson, Lebanon, N.J.

[73] Assignee: Congoleum Corporation, Kearny, N.J.

[21] Appl. No.: 831,045

[22] Filed: Feb. 12, 1986

Related U.S. Application Data

[63] Continuation of Ser. No. 549,949, Nov. 9, 1983, abandoned.

[51] Int. Cl.[4] .......................... B32B 5/02; B05D 3/02
[52] U.S. Cl. .................................... 428/236; 427/209; 427/244; 427/359; 427/366; 427/373; 427/389.8; 427/389.9
[58] Field of Search ............. 54/9, 949; 427/209, 427/244, 359, 366, 373, 389.8, 389.9

[56] References Cited

U.S. PATENT DOCUMENTS

| 2,870,038 | 1/1959 | MacIntyre | 118/60 |
| 4,138,521 | 2/1979 | Brown | 428/159 |
| 4,148,949 | 4/1979 | Casper et al. | 427/391 |
| 4,242,380 | 12/1980 | Courtoy | 427/389.8 |
| 4,273,819 | 6/1981 | Schmidle et al. | 427/373 |

Primary Examiner—Thurman K. Page
Attorney, Agent, or Firm—Paul & Paul

[57] ABSTRACT

A process is disclosed for the preparation of a composite mat having smooth upper and lower faces which composite mat comprises a mat of fibrous material encapsulated within a resinous polymeric gel.

9 Claims, 1 Drawing Figure

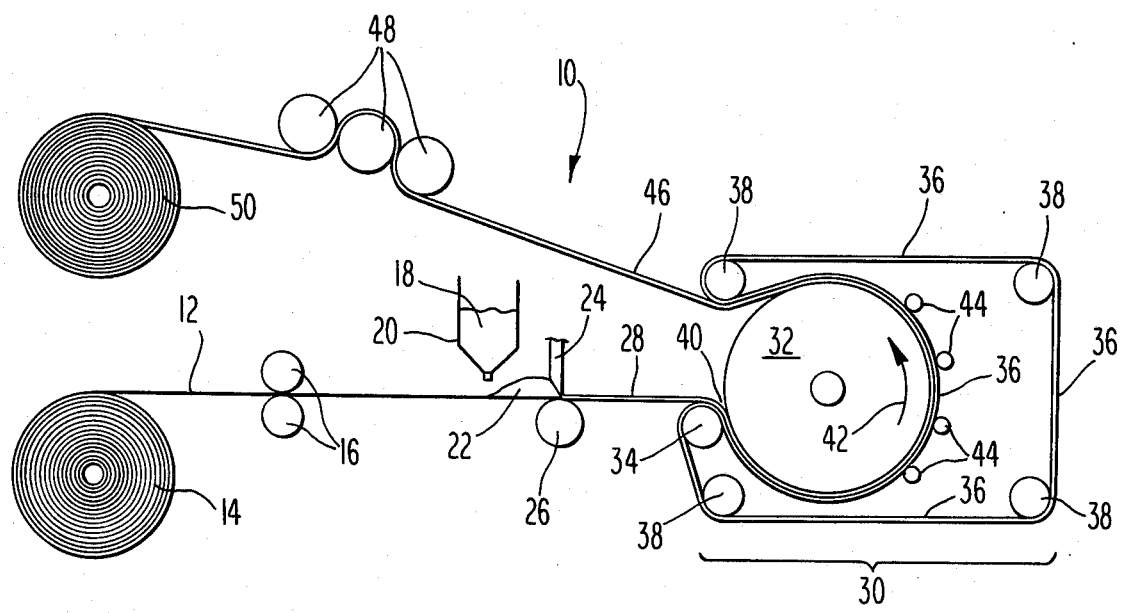

PROCESS FOR THE PREPARATION OF A COMPOSITE MAT

This application is a continuation of application Ser. No. 549,949 filed on Nov. 9, 1983 now abandoned.

FIELD OF THE INVENTION

The present invention relates to a process for the preparation of a composite mat having smooth upper and lower faces comprising a mat of fibrous material encapsulated within a resinous polymeric gel.

BACKGROUND OF THE INVENTION

The process of the present invention is intended for use in the preparation of vinyl sheet goods as surface coverings and the like, particularly floor coverings. By virtue of the superior properties of a product prepared by the present process however, the process has application in a number of other areas.

Traditionally, vinyl sheet goods for use as floor coverings and the like have been prepared by coating a backing web or substrate with a liquid resinous polymeric composition which is processed into the flooring material. A useful description of the process appears in U.S. Pat. No. 3,293,094 to Nairn, Harkins, Ehrenfeld and Tarlow. Some kind of substrate is necessary during the processing of the liquid resinous composition, and may be integrated into the final product or stripped away. If the substrate is included in the final product it will add strength and dimensional stability.

For some years the material most commonly employed for this substrate was a petrochemical impregnated asbestos fiber mat. However, asbestos has recently been linked to various health hazards and its continued availability as a raw material for the asbestos felts useful for this purpose is questionable.

Research into various alternative materials which can be employed for this purpose has been carried out, but most of the materials tested have been functionally unsuitable. Others, showing marginal technical success, would have required extensive and costly changes to process equipment in order to implement their use.

For reasons of economy, one of the avenues explored was the creation of a composite mat by impregnating a fibrous mat with the printable resinous polymeric material itself. While the initial testing on conventional machinery was successful in producing a composite mat with a printable surface, irregular variations in the thickness of the gelled polymer were encountered. Where foamable plastisol was used, these irregular variations were magnified in further processing of the material, particularly where such further processing resulted in incomplete foaming of the plastisol where such irregularities were located. Further, the opposite surface was often uneven with errant, non-encapsulated fibers, which would obstruct proper adhesion in flooring uses. An additional problem encountered was incomplete interstical filling of the mat.

U.S. Pat. No. 4,138,521 to Brown shows a substrate for vinyl floor coverings which comprises a smooth, non-woven tissue of glass fibers bonded within a synthetic binder. At least one surface of the substrate contains a continuous layer of resin at least partially impregnating into the surface. This reference does not contemplate the use of a foamable plastisol and the process described would not seem to be useable for this purpose. Since the depth to which the resin impregnates the tissue is not controlled, wide variations in thickness would be expected when the material were foamed. Further, no attempt is made to encapsulate the glass tissue as in the process of the present invention. Rather, the second surface would be separately coated with a layer of resin in a repetition of the demonstrated process. Without some additional teaching with respect to how all voids in the tissue could be filled, a teaching unnecessary to the use of non-foamed resins with which the reference is concerned, the process could not be made applicable to foamable plastisols.

OBJECT OF THE PRESENT INVENTION

It is an object of the present invention to provide a process for the preparation of a composite mat having smooth upper and lower faces comprising a mat of fibrous material encapsulated within a resinous polymeric gel.

The other objects, features and advantages of the present invention will become more apparent in light of the following detailed description of the preferred embodiment thereof.

According to the present invention, there is provided a process for the preparation of a composite mat having a smooth and printable first surface and a smooth and adherable opposite surface, which composite mat comprises a fibrous mat encapsulated within a printable resinous polymeric gel which process comprises:

(a) providing a supply of suitable fibrous mat material;

(b) combining a controlled amount of a liquid resinous polymeric composition with said fibrous material in such a manner that the liquid permeates into and through the interstices of the fibrous material and coats both surfaces of said fibrous mat, wherein the liquid resinous polymeric composition is capable of forming a printable resinous polymeric gel at a suitable temperature, thereby providing a liquid resinous polymeric composition saturated fibrous mat having a uniform thickness;

(c) providing a suitable environment for the gellation of said liquid resinous polymeric composition; and (d) maintaining the liquid saturated fibrous mat within said suitable environment for a sufficient of time to gel the liquid resinous polymeric composition to produce a fibrous mat encapsulated within a printable resinous polymeric gel.

BRIEF DESCRIPTION OF THE DRAWINGS

The FIGURE represents, in diagrammatic form, the process of the present invention.

DETAILED DESCRIPTION OF THE PRESENT INVENTION

It has now been found that a composite mat having a smooth and printable first surface and a smooth and adherable opposite surface, which composite mat is suitable for use in vinyl sheet goods such as flooring and the like, can be prepared employing essentially standard process machinery.

In structure, the composite mat prepared by the process of the present invention is not substantially different in appearance from the substrate previously employed. In the structure of that substrate, fibers of asbestos or another fibrous material normally in the form of a non-woven mat, are impregnated with a petrochemical. Such a non-woven asbestos fiber mat would be structurally suitable for use in the present invention and might be preferable but for the present focus of health inquiries. Various other woven and non-woven fibrous materials may be employed and these might include fiberglass, polyester, polypropylene, aramid, rayon or cellulose. In fact, any natural or man-made organic or inorganic woven or non-woven continuous porous mat compatible with the plasticizer or other solvent system could be employed in the practice of the present invention. This list would be narrowed somewhat by process considerations, such as the temperatures to which the composite material would be subjected in later processing. At present, however, the preferred material for this purpose would be non-woven fiberglass mat because of its availability, temperature characteristics and cost.

It should be apparent that the fibrous mat material need not be formed into a mat prior to being combined with a liquid resinous polymeric composition, as a sufficient quantity of staple fibers to form a mat in situ could first be mixed into a suitable liquid resinous polymeric composition. Then, the resulting mixture could be metered onto a stripable substrate or backing web. This procedure has not yet been implemented commercially because it would require greater modification of processing equipment, but is intended to be included within the process as presently described and defined in the claims.

The benefit of utilizing a pre-formed mat lies in the fact that it can be introduced into the process from a supply roll and will simulate the function of a backing web or substrate. This fibrous mat can be introduced into the present process in much the same fashion as the substrate material had been introduced in the process of the prior art. The thickness of the preformed mat of fibrous material will depend to a large extent upon the particular product to be made and the particular subsequent use for which it is intended. Normally, such thicknesses are in the range of about seven mils to about twenty mils, but other thicknesses, especially those greater than twenty-five mils, may be used in particular circumstances.

In the FIGURE, the process of the present invention is illustrated diagrammatically as (10). A pre-formed mat of fibrous material (12) is drawn from a supply, such as a roll of such material (14) illustrated, and conveyed, as by drive rollers (16), into the process (10). Tension on the supply roll, and other processing parameters can be used to determine the ratio of the thicknesses of the plastisol coating on each face of the mat.

A resinous polymeric composition, of the kind which will form a printable polymeric gel is then combined with the fibrous material. There is substantial literature with respect to the formulation of a printable polymeric gel, and the reader is referred to such literature for the teaching necessary to the formulation of a suitable polymeric composition for any specific purpose. Such resinous polymeric compositions may be made by well-known standard and conventional methods and may contain one or more polymer or copolymer of vinyl chloride or other resin.

Other constituents of such resinous polymeric compositions include: a blowing or foaming agent, such as azodicarbonamide, if a blowing or foaming agent is desired; various accelerator/stabilizers or catalysts such as dibasic lead phthalate, zinc octoate, zinc oxide, lead octoate, dibasic lead phosphite, etc., various light and/or heat stabilizers, and metallic soaps; plasticizers as dioctyl phthalate, butyl benzyl phthalate, dibutyl sebacate, etc.; coloring agents and pigments, such as titanium dioxide; solvents and diluents, such as methyl ethyl ketone, mineral spirits, etc.; fillers, such as clay and limestone; and many other conventional and well-known additives and improvement agents.

Although a polymer or copolymer of vinyl chloride in the form of a plastisol is the preferred and typical synthetic resin to be incorporated into the resinous polymer composition, many other resins are equally applicable, not only in plastisol form but also in organosol, latex or solvent form. The specific resin and its particular form of use, do not relate to the essence of the inventive concept and many other suitable resins are set forth in the prior art.

The resinous polymeric composition is also preferably a dispersion of a synthetic resin in a liquid medium, since the viscosity of the resin system must be low enough to permit the resin to be pressed into and through the fibrous material. Suitable viscosities for the resin system would be from about five hundred cycles per second (500 cps) to about twenty-five thousand cycles per second (25,000 cps), with viscosities in the range of fifteen hundred cycles per second (1500 cps) to five thousand cycles per second (5000 cps) being preferred. The dispersion medium can be a plasticizer in the case of a plastisol, or water in the case of an aqueous latex, or it can be an organic solvent in the case of an organosol. Excellent results are obtained with a dispersion of a synthetic resin in a plasticizer as a plastisol and such form is the preferred and typical form for the application of the present invention.

A few preferred and typical plasticizers useful in forming such plastisols are dibutyl sebacate, dioctyl sebacate, dioctyl adipate, didecyl adipate, dioctyl azelate, dibutyl phthalate, dicapryl phthalate, dioctyl phthalate, dibutoxy ethyl phthalate, tricresyl phosphate, octyl diphenyl phosphate, dipropylene glycol dibenzoate, butyl benzyl sebacate, dibenzyl sebacate, dibenzyl phthalate and butyl benzyl phthalate.

It is also to be appreciated that, although plastisols will be used to further describe the invention and in the Example which follows, such is not intended to exclude the use of organosols or aqueous latexes which are also utilizable.

Also, azodicarbonamide is indicated herein as the preferred and typical blowing or foaming agent to be included in the resinous polymeric composition when blowing or foaming is desired or required, and is employed in the Example which follows. However, many other similar blowing or foaming agents are also applicable and within the principle of the present invention. The specific blowing or foaming agent which is employed will be determined by such considerations as cost, availability and physical properties of the desired finished product. A number of acceptable blowing or foaming agents are well-known to the prior art. All that is required in the practice of the present invention is that the blowing or foaming agent remain unreacted during the process of gelling the resinous polymeric composition. For most resin systems, gellation will occur at an elevated temperature, and the blowing or foaming agent must have a decomposition temperature which is sufficiently high that it will not be activated or decomposed prematurely during the gelling process. It might also be noted that the blowing or foaming agent must also remain unreacted during any other preliminary steps, such as heating or mechanical embossing, or the like.

In a similar way, many other accelerators, initiators, catalysts, viscosity improvers, light and heat stabilizers, dyes, pigments, plasticizers, antioxidants, fillers, bacteriostats and bacteriocides, and many other additives may be included in the resinous polymeric composition. The specific nature and the particular physical and chemical properties and characteristics of the various constituents of the resinous polymeric composition should not be seen as limiting the nature of the present invention, and further elaboration of such additives is believed unnecessary. The use of these various classes of additives as well as specific coompounds for specific purposes, is well known to the art.

In the illustrated embodiment, a resinous polymeric composition (18) contained in reservoir (20) is introduced across the width of the moving preformed mat (12). This material may be deposited by gravity flow, if the reservoir is properly located, or by some kind of pumping action as necessary. A suitable amount of this deposited resinous polymeric composition (22) is allowed to accumulate uniformly across the width of the pre-formed mat (12), and this deposited resinous composition (22) is then metered by some means, such as by drawing the pre-formed mat (12) between the combination of a doctoring blade (24) and pressure roller (26), as illustrated. This operation results in a uniform layer of the viscous liquid resinous polymeric composition (28) being deposited on the fibrous mat (12).

Once the liquid resinous polymeric composition (28) and fibrous mat (12) have been prepared in such a manner, they are conveyed into a thermal environment suitable for gelling the liquid polymeric composition. One apparatus suitable for the creation of such an environment is shown as (30) in FIG. 1, and comprises a rotating heated drum (32), at least one pressure roller (34), a surrounding belt (36), and several tensioning rollers (38).

In the practice of the present invention, the liquid resinous polymeric composition (28) and fibrous mat (12) are brought into intimate contact with the outer surface of the rotating heated drum (32). Preferably, this is done at a point where a pressure roller (34) and the drum (32) create a nip (40) into which the fibrous mat (28) is drawn by the rotation of the drum, as indicated by the arrow (42). The effect of this nip (40) prevents the unwanted inclusion of air pockets which may result in voids and thus damage the finished product. The drum is preferably coated with a suitable release agent and maintained at a temperature suitable for gelling the liquid plastisol. Throughout the residence period, i.e., that period of time during which the liquid resinous polymeric composition (28) and fibrous mat (12) remain in thermal contact with the outer surface of the rotating heated drum (32), a sufficient quantity of heat is transferred to transform the resinous composition from a liquid to a gel.

It should be noted that this period of temperature transfer is critical for several reasons. First, the temperature of the rotating drum cannot be too great or the liquid resinous composition will become molten and adhere to the drum. Yet the temperature must not be too low, or the residence time required for the thermal transfer necessary to effect gellation will not be achieved at necessary operating speeds. Uniformity of thermal transfer and isolation of the thermal environment is greatly assisted by the presence of the surrounding belt (36). Belts of a similar appearance have been employed with processing equipment of this kind previously, but the purpose of such use was to maintain a suitable tension during lamination of dissimilar materials. In the present invention, the use of such a belt may serve as a molding functionality as well. Applicants are not aware of the employment of such a belt in contact with a liquid resinous polymeric composition, nor are they aware of the previous use of a belt wide enough for use in the preparation of vinyl sheet goods such as floor coverings. While it was useful to keep the belt employed in the process herein described in tension, it also assisted in creating a uniform thermal environment suitable for the efficient heat transfer necessary to gel the liquid resinous polymeric composition by enveloping the saturated mat during the residence period in thermal contact with the heated drum.

Auxillary pressure rollers (44) may be employed to assist in maintaining the necessary contact between the fibrous mat (28) and the heated drum (32). In addition, such rollers, if utilized, assist in maintaining a uniform thickness and help to insure consolidation of errant fibers within the polymeric gel.

After the resinous polymeric composition gels to produce a printable gel, which now encapsulates the fibrous mat, the fibrous mat encapsulated within the printable polymeric gel (46) is drawn off the heated drum (32) and it is useful to pass the encapsulated mat (46) over one or more chill rollers (48) to reduce the temperature of the product.

The cooled, encapsulated mat may be further processed immediately after preparation, as by rotogravure printing and heating to chemically emboss the polymeric gel in a manner well known to the art. However, in general and in the diagrammatic process illustrated here, the cooled, encapsulated mat is taken up in a storage roll (50) for later use.

It should be apparent to those skilled in the art that a suitable thermal environment can be created in other ways, and various alternatives come to mind. In this regard, a fibrous mat can be conveyed through a reservoir of suitable resinous polymeric composition and then squeezed by suitable nip rollers to provide a suitable saturated mat. To provide an environment for gellation of the resinous polymeric composition this saturated mat could then be drawn through a thermal environment, such as an oven, preferably a vertical oven where the effects of gravity may be avoided. Pairs of pressure rollers could be provided on each side of the saturated fibrous mat during its travel as necessary to assist in consolidating and collaborating the gelled product. An elaborate embodiment of such an alternative would include the use of two endless belts of the kind described above which would be used to encase the saturated mat, one covering each face, during the period of thermal transfer.

The present invention is shown more clearly in the following illustrative example.

EXAMPLE

A non-woven glass-fiber mat was obtained commercially and processed according to the steps of the present invention. The mat employed weighed approximately fifty grams per square meter (50 g/m$^2$) of which approximately twenty percent (20%) represented the weight of urea-formaldehyde which impregnated the fiber mat as a binder. The individual glass fibers varied from approximately eight microns to approximately thirteen microns in thickness and from about one and two-tenths centimeters (1.2 c.m.) to about two and fivetenths centimeters (2.5 c.m.) in length. The mat itself was a wet laid fiberglass tissue available commercially from the Johns-Manville Corporation and marketed under the trademark "Duraglass."

From a supply roll holding approximately eight thousand square yards of the fibrous material, a one hundred and forty-seven inch wide web was taken into the process at a rate of twenty inches per second (20 in/sec). This fibrous material was coated with a foamable and printable resinous polymeric composition in the form of a plastisol, the composition of which is set out in Table 1 below. This plastisol was fed by gravity from a reservoir and dispensed across the width of the fibrous mat. The mat was then drawn through a slit-like opening of twenty-five thousandths of an inch (0.025") formed by the combination of a doctor blade and a pressure roller. This combination is effective both in metering the amount of plastisol added and in promoting saturation of the fibrous mat by helping to force the plastisol into and through the interstices of the fibrous mat.

TABLE I

| | parts per hundred parts of resin |
|---|---|
| Vinyl Chloride Dispersion Resin (Geon 123 - BF Goodrich Chemical Group) | 66 |
| Vinyl Chloride Extender Resin (Goodyear M-70L - Goodyear Chemical Co.) | 34 |
| Primary Plasticizer (Plasticizer S160 - Monsanto Polymer Products Company, Inc.) | 44 |
| Secondary Plasticizer (Plasticizer S452 - Monsanto Polymer Products Company, Inc.) | 11 |
| Calcium Carbonate Filler (Passaic White B - R. E. Carroll Co.) | 80 |
| Blowing Agent (Azodicarbonamide & Zinc Oxide) | 5 |
| Cell Stabilizer (VS-103 - Air Products & Chemicals, Inc.) | 1 |
| Viscosity Depressant (Hyonic PE-40 - Diamond-Shamrock Chemical Company) | 1.5 |
| Diluent (Aromatic 150 - Sun Chemical Co.) | 2 |

The thus-saturated fibrous material mat was then conveyed into contact on the face of an oil-filled, heated, rotary drum supplied by the Olbrich Company and commonly employed in the manufacture of vinyl sheet goods. For this kind of use such a drum is preferably coated with a release agent, and the drum employed here was coated with a silicone release agent available commercially from the Mobay Chemical Company under the trademark "Baysilone." For the purpose of the present process this equipment had been fitted with a thirteen foot-wide endless belt similar in design to the narrow pressure belts commonly employed in preparing laminates with this equipment. The belt employed in this instance, however, was specially manufactured by the Globe Albany Division of Albany International, Northern America, located in Buffalo, N.Y. and had its entire working face, i.e., that face which would be in contact with liquid plastisol saturated fibrous mat, coated with a layer of silicone rubber having a thickness of one hundred and twenty mils. to prevent adhesion of the plastisol.

This endless belt passed over a pressure roller set in contact with the surface of the heated drum and the liquid plastisol-saturated fibrous mat was conveyed into the nip formed between the belt and the drum. Tension on the endless belt thereafter kept the plastisol saturated mat in intimate contact with the drum during its rotation.

The oil-filled drum employed was maintained at a constant temperature of 140° C. throughout the process of the present invention in a manner well known to the art. In addition, the drum was rotated at a speed of four and eighty-five one hundredths revolutions per minute (4.85 rev/min). During the residence period, i.e., that period during which the plastisol saturated mat is in thermal contact with the drum, the temperature of the plastisol was brought to a level where gellation of this plastisol composition would occur, somewhere from approximately 110° C. to 140° C., and was maintained at that level. Residence time within this environment was approximately nine seconds and was sufficient to gel this plastisol material.

The gel-encapsulated fibrous mat thus formed was taken off the drum and passed through a series of three chill rollers maintained at a temperature of 25° C. before being taken up by a storage roll.

On inspection, the gel-encapsulated fibrous mat was of generally uniform thickness and had a smooth and printable first surface and a smooth and adherable opposite surface. In addition, the product showed little or no evidence of voids and no errant fibers were detectable.

Other features, advantages and specific embodiments of this invention will become readily apparent to those exercising ordinary skill in the art after reading the foregoing disclosures. These specific embodiments are within the scope of the claimed subject matter unless otherwise expressly indicated to the contrary. Moreover, while specific embodiments of this invention have been described in considerable detail, variations and modifications of these embodiments can be effected without departing from the spirit and scope of this invention as disclosed and claimed.

What is claimed is:

1. A process for the preparation of a foamable composite mat having a smooth and printable first surface and a smooth and adherable opposite surface which foamable composite mat may be foamed to a uniform expanded thickness and which composite mat comprises a fibrous mat encapsulated within a foamable, printable resinous polymeric gel which process comprises:

(a) providing a supply of suitable fibrous mat material;

(b) combining a controlled amount of a foamable, liquid resinous polymeric composition with said fibrous mat material in such a manner that the foamable liquid permeates into and through the interstices of the fibrous material and coats both surfaces of said fibrous mat, wherein the foamable liquid resinous polymeric composition is capable of forming a printable resinous polymeric gel at a suitable temperature, thereby providing a foamable liquid resinous polymeric composition saturated fibrous mat having a uniform thickness;

(c) providing a suitable environment for the gellation of said foamable liquid resinous polymeric composition, said suitable environment for the gellation of said foamable liquid resinous polymeric composition consisting of a heated, rotary drum at least partially enclosed with a seamless belt, wherein the surface of said seamless belt coming into contact with the foamable liquid resinous polymeric composition has been coated with a silicone rubber; and (d) maintaining the foamable liquid saturated fibrous mat within said suitable environment for a sufficient period of time to gel the foamable liquid resinous polymeric composition to produce a fibrous mat encapsulated within a foamable and printable resinous polymeric gel.

2. The method of claim 1 wherein the resinous polymeric composition is a vinyl chloride polymer.

3. The method of claim 1 wherein the fibrous mat material is a non-woven fiberglass mat.

4. The method of claim 1 wherein the liquid resinous polymeric composition is metered onto the fibrous mat with the use of a doctor blade.

5. The method of claim 1 wherein the liquid resinous polymeric composition is metered onto the fibrous mat with the use of nip rollers.

6. The method of claim 1 wherein the resinous polymeric composition is in the form of a plastisol.

7. The method of claim 1 wherein the resinous polymeric composition is in the form of an organosol.

8. The method of claim 1 wherein the resinous polymeric composition is in the form of an aqueous latex.

9. A fibrous mat encapsulated within a printable resinous polymeric gel, prepared according to the process of claim 1.

* * * * *